(12) United States Patent
Hasan et al.

(10) Patent No.: US 7,813,459 B2
(45) Date of Patent: Oct. 12, 2010

(54) DIGITAL DATA TRANSFER BETWEEN DIFFERENT CLOCK DOMAINS

(75) Inventors: Qamrul Hasan, Mountain View, CA (US); Stephan Rosner, Campbell, CA (US); Jeremy Mah, San Jose, CA (US)

(73) Assignee: Spansion LLC, Sunnyvale, CA (US)

( * ) Notice: Subject to any disclaimer, the term of this patent is extended or adjusted under 35 U.S.C. 154(b) by 1327 days.

(21) Appl. No.: 11/242,215

(22) Filed: Oct. 3, 2005

(65) Prior Publication Data

US 2007/0076830 A1    Apr. 5, 2007

(51) Int. Cl.
*H04L 7/00* (2006.01)

(52) U.S. Cl. .................. 375/354; 375/355; 375/356; 375/357

(58) Field of Classification Search .................. 375/354, 375/355, 356, 357
See application file for complete search history.

(56) References Cited

U.S. PATENT DOCUMENTS

| 5,852,630 | A | * | 12/1998 | Langberg et al. ............ 375/219 |
| 5,909,563 | A | * | 6/1999 | Jacobs ........................ 710/305 |
| 6,549,593 | B1 | * | 4/2003 | Rumreich et al. ........... 375/354 |
| 6,900,665 | B2 | * | 5/2005 | Ma ............................. 326/94 |
| 2003/0081707 | A1 | * | 5/2003 | Takeuchi et al. ............ 375/354 |
| 2005/0097484 | A1 | * | 5/2005 | Sarwary et al. ............... 716/6 |
| 2005/0132313 | A1 | * | 6/2005 | Lindkvist ....................... 716/6 |
| 2006/0098770 | A1 | * | 5/2006 | Harper et al. ............... 375/356 |

FOREIGN PATENT DOCUMENTS

EP    1 071 005 A2    1/2001

OTHER PUBLICATIONS

International Search Report, Int'l Application No. PCT/US2006/037616, Int'l Filing Date Sep. 26, 2006, 4 pgs.

* cited by examiner

*Primary Examiner*—Shuwang Liu
*Assistant Examiner*—Kenneth Lam
(74) *Attorney, Agent, or Firm*—Eschweiler & Associates, LLC

(57) ABSTRACT

One or more aspects of the present invention pertain to transferring digital data between first and second domains, where a first clock of the first domain operates at a first frequency and a second clock of the second domain operates at a second frequency, where the first frequency is higher than the second frequency, and where the first and second clocks have arbitrary phase relationships relative to one another. Techniques employed facilitate efficient digital data transfer between the first and second domains while conserving valuable semiconductor real estate.

9 Claims, 7 Drawing Sheets

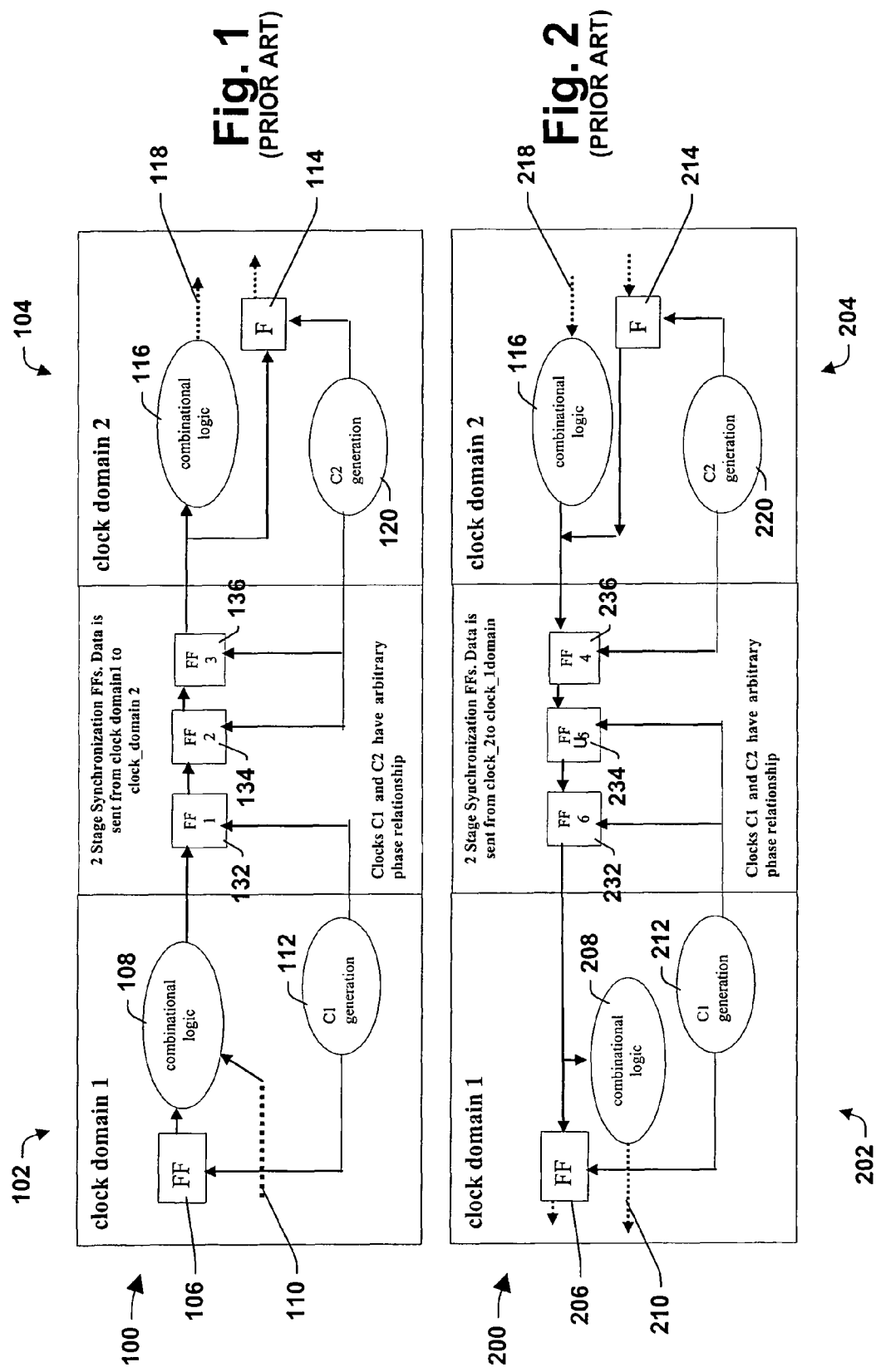

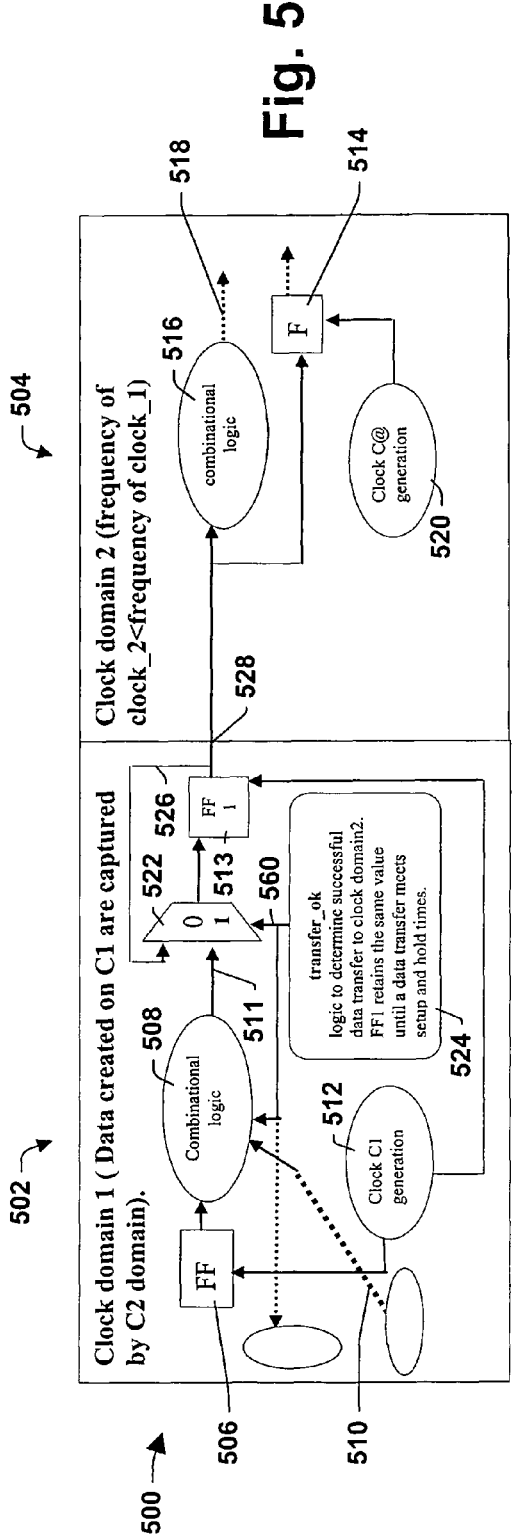
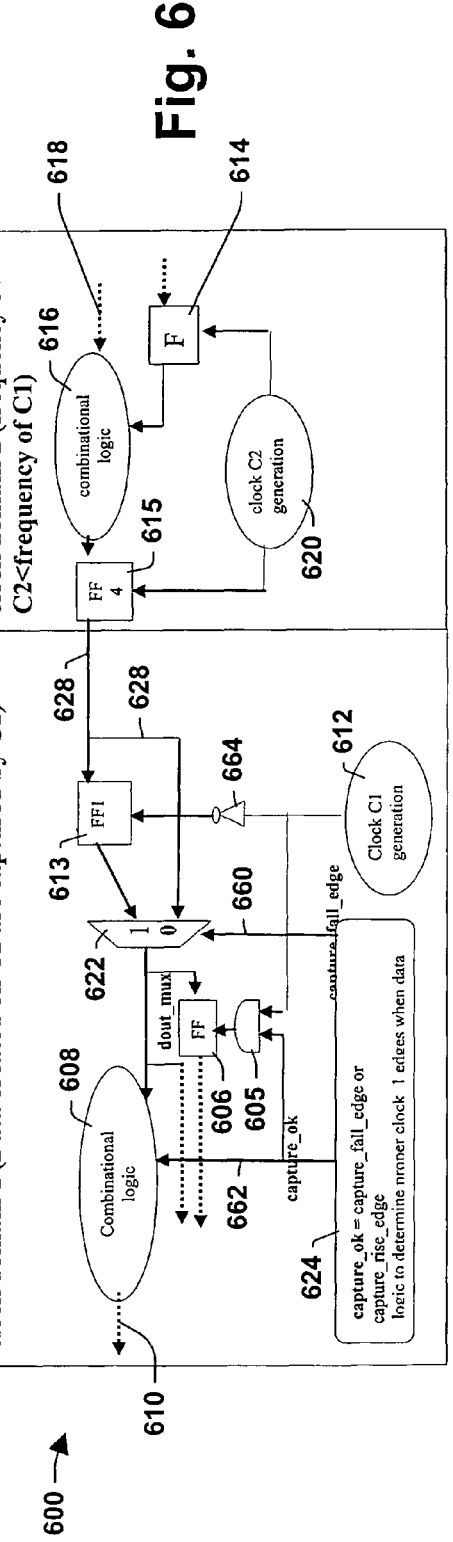
Fig. 5
Fig. 6

DIGITAL DATA TRANSFER BETWEEN DIFFERENT CLOCK DOMAINS

FIELD OF INVENTION

The present invention relates generally to data transfer in digital electronic devices, and more particularly to a scheme for efficiently transferring digital data between domains that operate on respective clocks.

BACKGROUND OF THE INVENTION

It can be appreciated that digital data is transferred across different domains in many applications. In a cellular telephone, for example, digital data my be quickly transferred back and forth many times between a processor and different types of memory within the cellular telephone, such as dynamic random access memory (DRAM) and FLASH memory, such as erasable programmable read only memory (EPROM) and electrically erasable programmable read only memory (EEPROM), for example.

When such data is transferred between and around different domains, different busses are used for the different transfers. In a cellular telephone, for example, respective memory buses are used for DRAM and FLASH memory, for example. It can be appreciated that having multiple busses takes up valuable semiconductor (and other) real estate within the cellular telephone, as well as in other similar handheld digital devices, as layout and routing designs are more complex and pin counts (which facilitate bus interconnections) are higher.

Additionally, different domains generally have arbitrary phase relationships, which is essentially a function of different clocks (or clock signals) being implemented in the different domains. Accordingly, circuitry or schemes are commonly implemented to synchronize data transfers. In particular, synchronization circuits are generally used on the clock domain that is receiving the data. Flip flops (FF) are commonly used to implement such synchronization schemes or circuitry. However, registers in the flip flops generally add a clock delay of the respective clocks that the flip flops are operating on. This can translate into significant delays in data transmissions. Additionally, the synchronization circuitry and flip flops occupy more valuable space.

Accordingly, since reducing the size and increasing the speed and capabilities of handheld digital devices is an ongoing desire in the electronics industry, a scheme that facilitates synchronized data transmissions while allowing flip flops (and the delays associated therewith) to be reduced, and that further conserves valuable real estate, such as by allowing different busses to be combined and pin counts to be reduced, for example, would therefore be desirable.

SUMMARY OF THE INVENTION

The following presents a simplified summary of the invention in order to provide a basic understanding of some aspects of the invention. This summary is not an extensive overview of the invention. It is intended neither to identify key or critical elements of the invention nor to delineate the scope of the invention. Rather, its primary purpose is merely to present one or more concepts of the invention in a simplified form as a prelude to the more detailed description that is presented later.

One or more aspects of the present invention pertain to a scheme that facilitates the efficient transfer of digital data between different domains where the domains operate on respective clock cycles. One or more aspects of the present invention promote area efficiency while mitigating delays associated with conventional schemes. More particularly, one or more aspects of the present invention mitigate the use of flip flops (FF) and thus delays associated with registers of the flip flops.

According to one or more aspects of the present invention, a system is disclosed that facilitates data transfer between first and second domains where a first clock of the first domain operates at a first frequency and a second clock of the second domain operates at a second frequency and the first and second clocks have arbitrary phase relationships relative to one another. The system includes an authorization component configured to determine when to transfer data from one domain to the other based upon at least one of a clock signal from the first domain and a clock signal from the second domain. The system also has a multiplexer configured to receive a control signal from the authorization component indicative of whether or not to effect a data transfer, the multiplexer being operatively coupled to a flip flop linking the first and second domains to one another to effect or not effect data transfer based on the control signal from the authorization component.

To the accomplishment of the foregoing and related ends, the following description and annexed drawings set forth in detail certain illustrative aspects and implementations of the invention. These are indicative of but a few of the various ways in which one or more aspects of the present invention may be employed. Other aspects, advantages and novel features of the invention will become apparent from the following detailed description of the invention when considered in conjunction with the annexed drawings.

BRIEF DESCRIPTION OF THE DRAWINGS

FIG. 1 is a schematic block diagram illustrating a conventional scheme for transferring digital data from a first domain to a second domain, where respective clocks of the domains have an arbitrary phase relationship.

FIG. 2 is a schematic block diagram illustrating a conventional scheme for transferring digital data from a second domain to a first domain, where respective clocks of the domains have an arbitrary phase relationship.

FIG. 3 is a schematic block diagram illustrating flip flops and data transfer there-between.

FIG. 5 is a schematic block diagram illustrating an exemplary scheme for transferring digital data from a first domain to a second domain according to one or more aspects of the present invention, where respective clocks of the domains have an arbitrary phase relationship, and where the clock of the first domain operates at a higher frequency than the clock of the second domain.

FIG. 6 is a schematic block diagram illustrating an exemplary scheme for transferring digital data from a second domain to a first domain according to one or more aspects of the present invention, where respective clocks of the domains have an arbitrary phase relationship, and where the clock of the first domain operates at a higher frequency than the clock of the second domain.

DETAILED DESCRIPTION OF THE INVENTION

Figure 3:
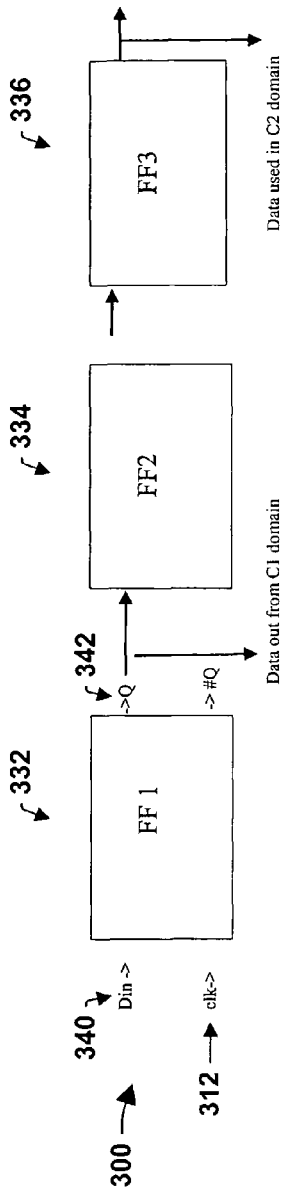

One or more aspects of the present invention are described with reference to the drawings, wherein like reference numerals are generally utilized to refer to like elements throughout, and wherein the various structures are not necessarily drawn to scale. In the following description, for purposes of explanation, numerous specific details are set forth in order to provide a thorough understanding of one or more aspects of the present invention. It may be evident, however, to one skilled in the art that one or more aspects of the present invention may be practiced with a lesser degree of these specific details. In other instances, well-known structures and devices are shown in block diagram or other form in order to facilitate describing one or more aspects of the present invention.

Turning initially to FIGS. 1-4, conventional schemes and issues associated therewith are presented. In FIG. 1, a scheme 100 is presented for transferring digital data from a first domain 102 to a second domain 104, where respective clocks of the first 102 and second 104 domains generate clock signals that have arbitrary phase relationships. The first domain 102 generally comprises a first flip flop (FF) 106 operatively coupled to a first combinational logic component 108, where the first combinational logic component 108 is also configured to receive first external signals 110. A C1 generation component 112 or first clock is also comprised within the first domain 102 to provide first clock signals within the first domain for "clocking" data through the first domain for "clocking" data through the first domain 102. As such, the first clock 112 is operatively coupled to the first flip flop 106.

Similarly, the second domain 104 generally comprises a second flip flop 114 operatively coupled to a second combinational logic component 116, where the second combinational logic component 116 is configured to output second external signals 118. A C2 generation component 120 or second clock is also comprised within the second domain 104 to provide second clock signals within the second domain for "clocking" data through the second domain 104. As such, the second clock 120 is operatively coupled to the second flip flop 114.

Since the clock signals have arbitrary phase relationships, a synchronization stage 130 is included to synchronize data transfers between the first 102 and second 104 stages. In the illustrated example, the synchronization stage 130 comprises a string of three flip flops 132, 134, 136 operatively coupled to one another. Since data is being transferred from the first domain 102 to the second domain 104 in the illustrated example, the first combinational logic component 108 and the first clock component 112 are operatively coupled to the first synchronization flip flop 132 of the synchronization stage 130. To provide some redundancy and mitigate incorrect data transfers, both the second 134 and third 136 flip flops of the synchronization stage 130 are operatively coupled to the second domain 104, and more particularly to the second clock component 120 and the second combinational component 116.

Similarly, FIG. 2 illustrates a scheme 200 for transferring digital data from a second domain 204 to a first domain 202, where respective clocks of the first 202 and second 204 domains generate clock signals that have arbitrary phase relationships. The first domain 202 generally comprises a first flip flop (FF) 206 operatively coupled to a first combinational logic component 208, where the first combinational logic component 208 is configured to output first external signals 210. A C1 generation component 212 or first clock is also comprised within the first domain 202 to provide first clock signals within the first domain for "clocking" data through the first domain 202. As such, the first clock 212 is operatively coupled to the first flip flop 206.

Similarly, the second domain 204 generally comprises a second flip flop 214 operatively coupled to a second combinational logic component 216, where the second combinational logic component 216 is configured to receive second external signals 218. A C2 generation component 220 or second clock is also comprised within the second domain 204 to provide second clock signals within the second domain for "clocking" data through the second domain 204. As such, the second clock 220 is operatively coupled to the second flip flop 214.

Since the clock signals have arbitrary phase relationships, a synchronization stage 230 is included to synchronize data transfers between the first 202 and second 204 stages. In the illustrated example, the synchronization stage 230 comprises a string of three flip flops 232, 234, 236 operatively coupled to one another. Since data is being transferred from the second domain 204 to the first domain 202 in the illustrated example, the second combinational logic component 216 and the second clock component 220 are operatively coupled to the third synchronization flip flop 236 of the synchronization stage 230. To provide some redundancy and mitigate incorrect data transfers, both the first 232 and second 234 flip flops of the synchronization stage 230 are operatively coupled to the first domain 202, and more particularly to the first clock component 212 and the first combinational logic component 208.

Nevertheless, while these schemes 100, 200 may provide for relatively accurate data transfers, each of the flip flops, and more particularly respective registers of the flip flops, of the synchronization circuits can add a clock delay of its respective clock as a delay. Since one flip flop is associated with the transmitting domain and two flip flops are associated with the receiving domain in the illustrated examples, this can lead to a total delay of 1 clock period of the transmitting clock and 2 clock periods of the receiving clock. It can be appreciated that such synchronization latency can cause significant problems in latency sensitive designs.

By way of further example, FIG. 3 illustrates three flip flops 332, 334, 336, where data (Din) 340 is fed into the first flip flop 332 along with a first clock signal 312. The data is then output at Q 342 of the first flip flop 332 and fed into the second flip flop 334, and then from the second flip flop 334 to the third flip flop 336, and so on. Referring back to FIG. 1, for example, the data output at Q 344 can correspond to the data output from the first domain 102. Likewise, the data output from the third flip flop 336 can correspond to the data being input into the second domain 104.

Figure 4:
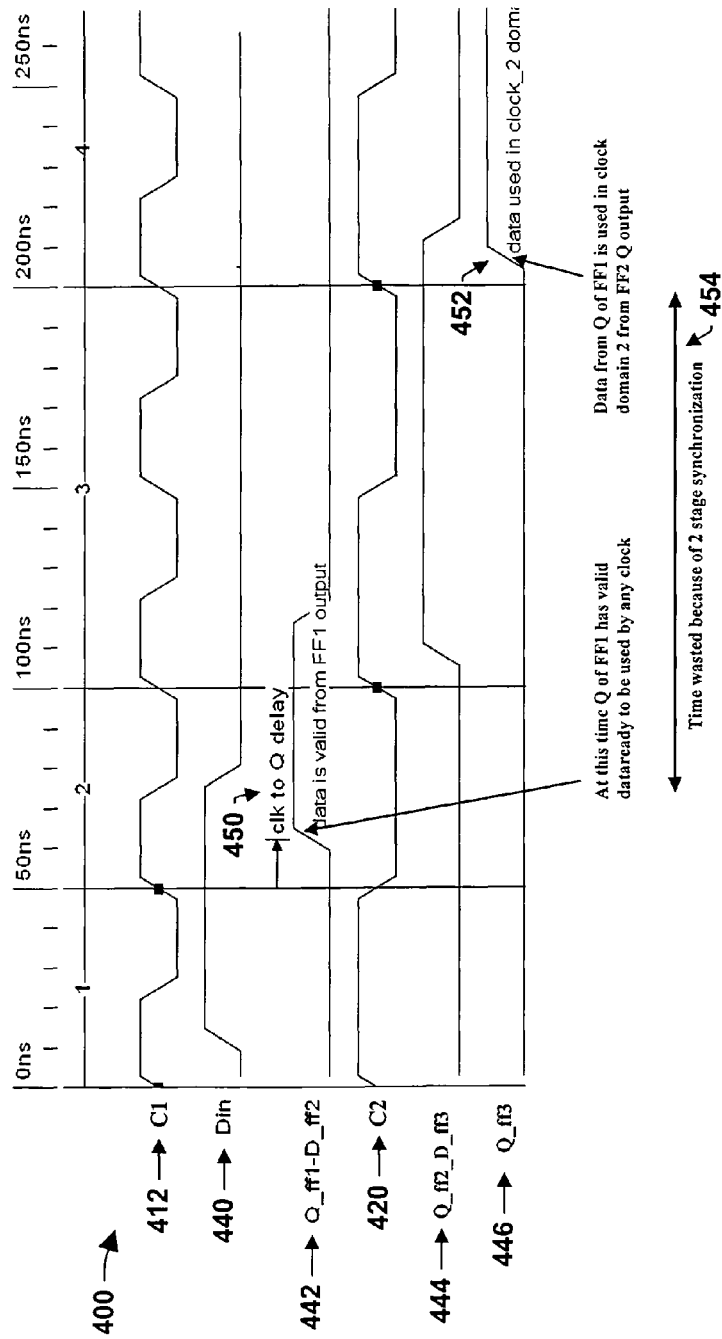
FIG. 4 is a timing diagram illustrating data transfer signals, such as for the flip flops (FF) illustrated in FIG. 3.

FIG. 4 is a timing diagram 400 illustrating the transfer of data between flip flops, such as those depicted in FIG. 3. In particular, FIG. 4 displays a first clock signal (C1) 412, a signal 440 for the data Din input into first flip flop 332, a signal 442 corresponding to the data output from the first flip flop 332 which is then the data (Din) to the second flip flop 334, a second clock signal (C2) 420, a signal 444 corresponding to the data output from the second flip flop 334 which is then the data (Din) input to the third flip flop 336, and finally a signal 446 corresponding to the data output from the third flip flop 336.

It will be appreciated that the data 440 input to the first flip flop 332 appears at the output port Q of the first flip flop 332 after a delay associated with the first flip flop, and more particularly a register of the first flip flop. This delay is designated as clock to Q delay 450 in the timing diagram 400 of FIG. 4. If this data is then sampled in the second clock domain, the time or window to capture the data remains open from clock to Q delay 450 to the setup time of the next rising edge of the data driving clock. It can be seen that the data at the output Q of the first flip flop 332 is fed into the second 334 and third 336 flip flops, which are both operating at C2 in the second domain, before the data can be used in the second domain as indicated at 452.

While this technique is reliable, it is not time efficient because of the 2 cycles of synchronization delays needed in the receiving clock domain 2, as illustrated by arrow 454. Moreover, even more clock cycles are lost in the first domain if the frequency of C1 is much higher than that of C2. In such a case, clock domain 1 must hold the same data in the first flip flop 332 until 2 C2 edges occur. For example, if the C1 period is 10 ns and the C2 period is 30 ns, then the first flip flop 332 needs to hold the same data for two C2 cycles which in this case is 60 ns. This turns out to be 6 cycles of C1.

Turning to FIG. 5, an exemplary scheme 500 is illustrated for transferring digital data across different domains according to one or more aspects of the present invention without the use of a synchronization stage and/or synchronization flip flops, thereby providing fast and efficient data transfers. In the illustrated example, data is transferred from a first domain 502 to a second domain 504, where respective clocks of the domains have an arbitrary phase relationship, and where the clock of the first domain 502 operates at a higher frequency than the clock of the second domain 504 (e.g., data is transferred from high to low).

The first domain 502 generally comprises a first flip flop (FF) 506 operatively coupled to a first combinational logic component 508, where the first combinational logic component 508 is also configured to receive first external signals 510 and to output first combinational signals 511. A C1 generation component 512 or first clock is also comprised within the first domain 502 to provide first clock signals within the first domain for "clocking" data through the first domain 502. As such, the first clock 512 is operatively coupled to the first flip flop 506. According to one or more aspects of the present invention, however, the first clock 512 is also coupled to a first output flip flop 513. The first output flip flop 513 is also operatively coupled to a first multiplexer 522 so as to receive data from the first multiplexer 522. A transfer ok component 524 is also operatively coupled to the first multiplexer 522, as is the combinational logic component 508 and a feedback loop 526 from the first output flip flop 513. It will be appreciated that components 506, 508, 512, and circuitry thereof, may be comprised within one or more ASIC logic structures. Importantly, signals 511 may or may not be transferred to the second domain 504 depending upon output from the transfer ok component 524 as described below.

Output 528 from the first output flip flop 513 is operatively coupled to a second combinational logic component 516 of the second domain 504. The second domain 504 also comprises a second flip flop 514 operatively coupled to the second combinational logic component 516, where the second combinational logic component 516 is configured to output second external signals 518. A C2 generation component 520 or second clock is also comprised within the second domain 504 to provide second clock signals within the second domain for "clocking" data through the second domain 504. As such, the second clock 520 is operatively coupled to the second flip flop 514. It will be appreciated that components 514, 516, 520, and circuitry thereof, may be comprised within one or more ASIC logic structures. Importantly, signals 511 may or may not be transferred to the second domain 504 (as 528 in the illustrated example) depending upon output from the transfer ok component 524 as described below.

Figure 7:
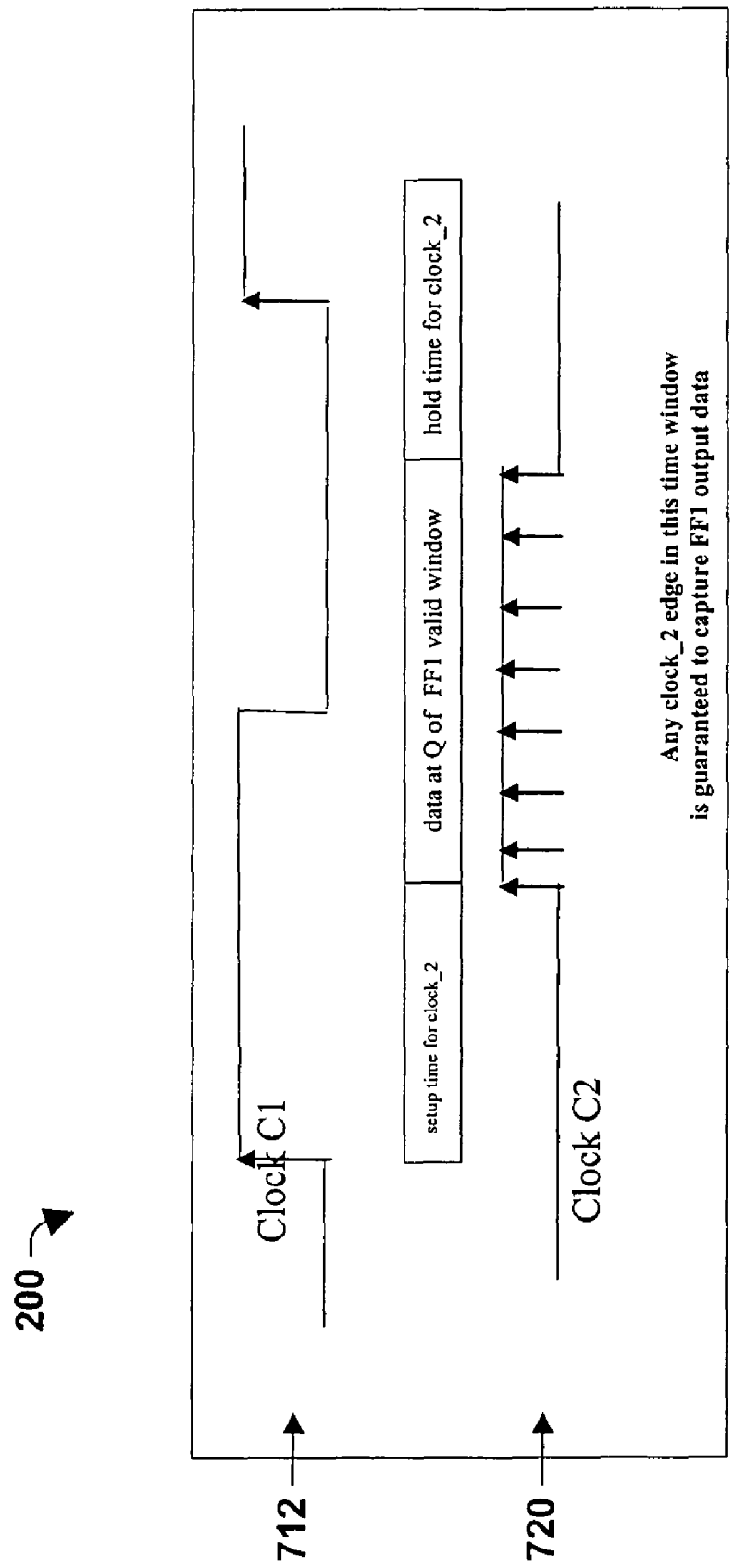
FIG. 7 is a timing diagram illustrating clock signals, such as may correspond to those depicted in FIGS. 5 and 6, and data transfer notions in accordance with one or more aspects of the present invention.

It will be appreciated that transfer ok 524 is a circuit component that calculates a setup time for clock 2 520 and determines when it is ok to take data from the output 528 of the first output flip flop 513 (e.g., when the setup time is sufficient to capture data from clock domain 1). Data at the output 528 of the first output flip flop 513 will be valid or can be captured if the setup time for clock 2 520 has passed (as illustrated in FIG. 7). The transfer ok component 524 generates a transfer ok signal 560 via one or more programs (illustrated below) executed by transfer ok circuitry. The transfer ok signal 560 is a control signal (e.g., a 0 or a 1) that is sent to the first multiplexer 522. According to one or more aspects of the present invention, when the transfer ok signal 560 is a 1, the transfer ok component 524 essentially instructs the first multiplexer 522 to pass the first combinational signals 511 from the first combinational logic component 508 through to the first output flip flop 513, and thus onto the second domain 504. Conversely, when the transfer ok signal 560 is a 0, the first multiplexer 522 is directed to pass the output 528 from the first output flip flop 513 back through the feedback loop 526 so that new data is not passed to the second domain 504.

FIG. 6 illustrates a similar exemplary scheme 500 for transferring digital data across different domains according to one or more aspects of the present invention without the use of a synchronization stage and/or synchronization flip flops, thereby providing fast and efficient data transfers. In this example, however, data is transferred from a second domain 602 to a first domain 604, where respective clocks of the domains have an arbitrary phase relationship, and where the clock of the first domain 602 operates at a higher frequency than the clock of the second domain 604 (e.g., data is transferred from low to high).

The second domain 604 generally comprises a second flip flop 614 operatively coupled to a second combinational logic component 616, where the second combinational logic component 616 is configured to receive second external signals 618. A C2 generation component 620 or second clock is also comprised within the second domain 604 to provide second clock signals within the second domain for "clocking" data through the second domain 604. As such, the second clock 620 is operatively coupled to the second flip flop 614, as well as to a second output flip flop 615, the output 628 of which feeds into the first domain 602. It will be appreciated that components 614, 616, 620, and circuitry thereof, may be comprised within one or more ASIC logic structures. Importantly, signals 628 may or may not be captured by the first domain 602 depending upon output from a capture ok component as described below.

The output 628 of the second output flip flop 615 of the second domain 604 feeds into a first input flip flop 613 of the first domain 602. Similarly, the first input flip flop 613 and the output 628 from the second output flip flop 615 feed into a first multiplexer 622 of the first domain 602. A capture fall edge signal 660 from a capture ok component 624 of the second domain 604 is also fed into the first multiplexer 622.

The capture ok component 624 also generates a capture ok signal 662 which is applied to a first combinational logic component 608 of the first domain 602, where the first combinational logic component 608 is configured to output first external signals 610. A C1 generation component 612 or first clock is also comprised within the first domain 602 to provide first clock signals within the first domain for "clocking" data through the first domain 602. As such, the first clock 612 is operatively coupled to the first input flip flop 613. In the illustrated example, the first clock 612 is operatively coupled to the first input flip flop 613 through an inverter 664 so as to apply an inverted clock signal thereto. The first clock 612 and the capture ok signal 662 are also input to an AND gate 605 which feeds into a first flip flop 606. The first multiplexer 622 also feeds into the first flip flop 606, as well as the first combinational logic component 608.

It will be appreciated that capture ok 624 is a circuit component that calculates when it is ok to capture data from the second (lower frequency) domain 604. According to one or more aspects of the present invention, when data from the second domain 604 is captured on a falling edge, the capture ok component supplies a 1 to the first multiplexer 622. Conversely, when data is captured on a rising edge, the capture ok component outputs a 0 to the first multiplexer 622. Data from the second output flip flop 615 is accordingly supplied directly to the first multiplexer 622 when the capture ok component 624 outputs a 0 (e.g., data captured on rising edge). Conversely, data from the second output flip flop 615 is stored in the first input flip flop 613 before being passed to the first multiplexer 622 (and on to the first combinational logic component 608) when the capture ok component 624 outputs a 1 to the first multiplexer 622 (e.g., data captured on falling edge). Stated another way, if a 0 is applied to the first multiplexer 622, data is transferred directly through the first multiplexer 622 from the second output flip flop 615 to the first domain 602, whereas the data is stored in the first input flip flop 613 before being transferred to the first domain (through the first multiplexer 622) when a 1 is applied to the first multiplexer 622 by the capture ok component 624. It will be appreciated that the first flip flop 606 at the output of AND gate 605 is merely included to illustrate that data can additionally be captured by such a component as well as the first combinational logic component 608. Additionally, the capture ok signal 662 goes directly to the first combinational logic component 608 so that, in the event that there is another flip flop (not shown) behind the first combinational logic component 608, a determination can readily be made as to whether valid or "capturable" data is present.

FIG. 7 is a timing diagram illustrating first and second clock signals 712, 720, which may correspond to respective signals generated by the first 512, 612 and second 520, 620 clocks FIGS. 5 and 6, particularly since the first clock signal 712 is operating at a higher frequency than the second clock signal 720. By way of example, the first (higher frequency) domain 502, 602 can operate at 100 mhz and second (lower frequency) domain 504, 604 can operate at 10 mhz. When data is transferred from the first (high frequency) domain c1 to the second (low frequency) domain c2 there are ten edges of c1 for one edge of c2. Conversely, when data is transferred from the second (low frequency) domain c2 to the first (high frequency) domain c1 there is one edge of c2 for ten edges of c1 where data can be captured on any of the ten edges of c1. It is generally desirable to capture data as early as possible, so data may be captured on rising edge of c2 in the configuration in FIG. 6. If data is not captured on rising edge of c2, however, the data will be captured on the falling edge. On the falling edge, the setup and hold time requirements will be met so that the data can be captured.

Following are one or more exemplary algorithms for analyzing the relation of clock edges with regard to setup and hold times for data transfers from both high frequency to low frequency domains (e.g., from the first domain 502 to the second domain 504 in FIG. 5), and low frequency to high frequency domains (e.g., from the second domain 604 to the first domain 602 in FIG. 6). It is generally assumed for purposes of the algorithms that the clock periods are not integer multiples of one another because major difficulties associated with transferring data between different clock domains come from clocks with arbitrary periods and phases. It is also assumed that the highest frequency (e.g., the lowest clock period) is less than the library setup and hold time for the given process technology. This is axiomatic for digital designs where a digital sequential circuit can not be implemented if the clock period is less than setup and hold time. Finally, it is assumed that the first clock edges of the clocks under discussion are in phase, meaning that at time 0, the clocks have a rising edge. This allows a periodically occurring time window to be defined that is representative of timing relations of clock edges of C1 and C2. A phase locked loop (PLL), for example, can be used to determine the time T0 where clock edges are lined up for clocks C1 and C2 since, in most designs, clocks correspond to the output of a PLL. Generally, lock, and the rising edges of a clock occur at the same time.

Respective definitions of a few variables for an exemplary algorithm for clock synchronization between different clock domains are as follows:

P1 is clock period of clk C1
P2 is clock period of clk C2

$P1 \leq P2$

The clock phase alignment between C1 and C2 is periodic in period Pc:

$Pc = P1 \cdot P2$

In Pc a number of rising edges of clock C1 occur, representing the set of edges:

$E1 = \{e1_n\}$, $t(e1_n) = n \cdot P1$ and $t(e1_n) \leq Pc$.

In Pc a number of rising edges of clock C2 occur, representing the set of edges:

$E2 = \{e2_m\}$, $t(e2_m) = m \cdot P2$ and $t(e2_m) \leq Pc$

The number of edges in E1 and E2 can be described by:

$card(E1) = Pc/P1 = P2$ and $card(E2) = Pc/P2 = P1$

Therefore the variables n and m can be bound to:

$n \in [0, P2-1]$ and $m \in [0, P1-1]$.

For transferring data from a domain having a relatively high clock frequency (e.g., first domain 502, 602 in FIGS. 5 and 6) to a domain having a relatively low clock frequency (e.g., second domain 504, 604 in FIGS. 5 and 6), the following apply.

Problem: determine for each edge $e2_m$ of the slower clock C2 that occurs at time $t(e2_m)$ whether the immediately following edge $e1_n$ of C1 at time $t(e1_n)$ meets setup and hold time. If yes, edge $e1_n$ is marked as a valid edge to capture data from clock domain C2.

Solution: enable data transfers across clock domain C1→C2 only on edges in E1 that are marked valid. For marking edges use the following algorithm:

```
For (n = 0, n ≤ P2 - 1, n++)
{ m =
⌈n·P1⌉
⌈────⌉ ...(1a) // determine edge e2_m that immediately follows edge e1_n
⌈ P2 ⌉ if (P2/P1) is an integer then,
  if(n==P2 - 1) mark e1n as valid
  else if(t(e2_m) - t(e1_n) > t_setup and t(e1_{n+1}) - t(e2_m) > t_hold)
    mark e1_n as valid
  else mark e1_n as invalid
}
```

For transferring data from a domain having a relatively low clock frequency (e.g., second domain 504, 604 in FIGS. 5 and 6) to a domain having a relatively high clock frequency (e.g., first domain 502, 602 in FIGS. 5 and 6), the following apply.

Problem: Determine for each edge $e2_m$ occurring at time $t(e2_m)$ of the slower clock C2 whether the immediately preceding edge $e1_n$ of C1 at time $t(e1_n)$ meets setup and hold time. If yes, edge $e1_n$ is marked as a valid edge to create data for clock domain C2.

Principle: The edge alignment for C1 and C2 is periodic in Pc. Divide PC into a set of periods P2. Each period P2 begins with a rising edge $e2_m$. In each P2 a set of k edges from E1 is contained that may align differently to the rising edge $e2_m$. The first edge from E1 out of those k edges is denoted with n. Only $e2_m$ and the k E1 edges following $e2_m$ within a P2 interval have a timing relation with each other. The reason is that only those E1 edges read data created by $e2_m$.

The algorithm first determines the time $t(e2_m)$ of that rising edge E2 and the time of all following k rising edges from E1 that follow $e2_m$ and fall in the interval P2 beginning with $t(e2_m)$. The algorithm then tests whether setup and hold time for any E1 edge following $e2_m$ within the P2 interval is met.

Solution: Enable data transfers across clock domain C2→C1 only on edges in E1 that are marked valid. For marking edges use the following algorithm:

```
For (m = 0, m ≤ P1 - 1, m++)
{ n = ⌈m·P2⌉
    ⌈────⌉ ...
    ⌈ P1 ⌉

(2a) // determine edge e1_n that immediately follows edge e2_m

For (k = 0, k ≤ |P2/P1| - 1, k++)
{
  if (t(e1_{n+k}) - t(e2_m) > t_setup and t(e2_{m+1}) - t(e1_{n+k}) > t_hold)
    mark e1_n valid
  else mark e1_n invalid
}
}
```

Following is an exemplary program implemented in C that can be utilized to run or execute the aforementioned algorithm to determine valid clock edges for high to low and low to high frequency data transfer. The program requires 4 inputs from a user, namely P1, P2, setup time and hold time. Following the program an exemplary output is provided for, P1=10 ns
P2=14 ns
Setup time=2 ns
Hold time=2 ns.

```
cdc_check.cpp:
#include <stdio.h>
void main( )
{
  int P1 = 10;//clock period of faster clock C1
  int P2 = 14;//clock period of slower clock C2
  int Pc = P1 * P2;//time interval for which edges of C1 and C2 are periodic
  int m = 0;
  int n = 0;
  int k = 0;
  int ratio = 0;
  int setup_check;
  int hold_check;
  int tsetup = 2;//library setup check for a flip flop
  int thold = 2;//library hold check for an flip flop
  FILE *fp;
  fp = fopen("cdc_check.dat", "w");//output file is cdc_check.dat
  fprintf(fp, "\nData is Transfered from High Frequency(clk1) to Low Frequency(clk2) Dommain\n");
  fprintf(fp, "\nThe program finds valid edges on clk1 for which data is transfered to clk2\n\n");
  fprintf(fp, "\n *****************start of high to low calculation ************************\n\n");
  for ( n = 0 ; n <= P2-1 ; n++)//n is total number of clk1 edges in time P1*P2
  {
    if( n == 0)
    {
      m = 0;
    }
    else {
      m = 1 + (n*P1)/P2;//m is the clk2 edges. this equation takes into account that for each m there
                        //maybe more than one number of n edges that need to be checked
                        //m is the upper bound of (n*P1)/P2. here m is declared as an integer
                        //which takes the lower bound. so adding 1 to it.
    setup_check = m*P2 - n*P1;//setup violation check
    hold_check = (n+1)*P1 - m*P2;//hold time violatio check
    if (setup_check > tsetup && hold_check > thold)//ensuring that clk2 edges meet setup
                                                    //and hold time
```

```
        {
            fprintf(fp,"clk1 Edge %d ---Valid -----> Ts %d, Th %d\n\n",n,setup_check,hold_check);
            //Ts is setup, Th is hold. Printing valid edges
        }
        else
        {
    fprintf(fp,"clk1 Edge %d ****Invalid**** Ts %d, Th %d\n\n",n,setup_check,hold_check);
            //Printing non valid edges
        }
    }
    fprintf(fp, "\n *****************end of high to low calculation **********************\n\n");
    fprintf(fp, "\n *****************start of low to high calculation **********************\n\n");
    //re intializing the variables for low to high calculation
    m = 0;
n = 0;
k = 0;
ratio = P2/P1;
    fprintf(fp, "\nData is Transfered from Low Frequency(clk2) to High Frequency(clk1) Domain\n\n");
fprintf(fp, "\nThe program finds valid edges of clk1 for which data is captured\n\n");
for ( m = 0 ; m <= P1−1 ; m++)//n is total number of clk1 edges in time P1*P2
    {
        if( m == 0)
        {
            n = 0;
        }
        else {
        n = 1 + (m*P2)/P1;
    }// n is similar to m in high to low calculation. for each m, there could be more than one clk1
        //edges. n is taking into account for those edges
        k = 0;
        for ( k =0; k <= ratio; k++ )
        {
            setup_check = (n+k)*P1 − m*P2;//setup violation check
            hold_check = (m+1)*P2 − (n+k)*P1;//hold time violatio check
            if(setup_check > P2 ) break;
            if (setup_check > tsetup && hold_check > thold)//ensuring that clk2 edges meet setup
                //and hold time
            {
                fprintf(fp,"clk1 Edge %d -----Valid -----> Ts %d, Th %d \n\n",(n+k),setup_check,hold_check);
                //Ts is setup, Th is hold. Printing valid edges
            }
            else
            {
    fprintf(fp,"clk1 Edge %d ******Invalid***** Ts %d, Th %d \n\n",(n+k),setup_check,hold_check);
                //Printing non valid edges
            }
        }
    }
    fprintf(fp, "\n *****************end of low to high calculation **********************\n\n");
    fclose(fp);
}
```

The exemplary C program outputs valid C1 edges in the following manner:

```
Data is transferred from High Frequency (clk1) to Low Frequency (clk2) Domain
The program finds valid edges on clk1 for which data is transferred to clk2
***************start of high to low calculation ********************
clk1 Edge 0 ****Invalid**** Ts 0, Th 10
clk1 Edge 1 ---Valid -----> Ts 4, Th 6
clk1 Edge 2 ****Invalid**** Ts 8, Th 2
clk1 Edge 3 ****Invalid**** Ts 12, Th −2
clk1 Edge 4 ****Invalid**** Ts 2, Th 8
clk1 Edge 5 ---Valid -----> Ts 6, Th 4
clk1 Edge 6 ****Invalid**** Ts 10, Th 0
clk1 Edge 7 ****Invalid**** Ts 14, Th −4
clk1 Edge 8 ---Valid -----> Ts 4, Th 6
clk1 Edge 9 ****Invalid**** Ts 8, Th 2
clk1 Edge 10 ****Invalid**** Ts 12, Th −2
clk1 Edge 11 ****Invalid**** Ts 2, Th 8
clk1 Edge 12 ---Valid -----> Ts 6, Th 4
clk1 Edge 13 ****Invalid**** Ts 10, Th 0
***************end of high to low calculation ********************
***************start of low to high calculation ********************
Data is transferred from Low Frequency (clk2) to High Frequency (clk1) Domain
The program finds valid edges of clk1 for which data is captured
clk1 Edge 0 ******Invalid***** Ts 0, Th 14
clk1 Edge 1 -----Valid -----> Ts 10, Th 4
clk1 Edge 2 -----Valid -----> Ts 6, Th 8
clk1 Edge 3 ******Invalid***** Ts 2, Th 12
clk1 Edge 4 ******Invalid***** Ts 12, Th 2
clk1 Edge 5 -----Valid -----> Ts 8, Th 6
clk1 Edge 6 -----Valid -----> Ts 4, Th 10
clk1 Edge 7 ******Invalid***** Ts 14, Th 0
clk1 Edge 8 -----Valid -----> Ts 10, Th 4
clk1 Edge 9 -----Valid -----> Ts 6, Th 8
clk1 Edge 10 ******Invalid***** Ts 2, Th 12
clk1 Edge 11 ******Invalid***** Ts 12, Th 2
clk1 Edge 12 -----Valid -----> Ts 8, Th 6
clk1 Edge 13 -----Valid -----> Ts 4, Th 10
clk1 Edge 14 ******Invalid***** Ts 14, Th 0
***************end of low to high calculation ********************
```

Following is an example of how the output from the C program can be utilized to implement one or more digital circuit (e.g., transfer ok component 524 in FIG. 5 and/or capture ok component 624 in FIG. 6) to facilitate data transfer according to one or more aspects of the present invention. The output of the program provides two sets of C1 edges, namely:

valid C1 edges for which data is transferred from C1 domain to C2 domain, and valid C1 edges for which data is transferred from C2 domain and captured in C1 domain.

A ring counter can be readily implemented that counts up for every C1 rising edge and resets itself at time P1*P2. Similarly, from the output of the counter, along with Valid C1 edges logic can be readily implemented for transfer_ok, capture_ok, capture_fall_edge, and capture_rise_edge. An exemplary implementation for the forgoing example, looks like the following:

To transfer from a higher frequency domain to a lower frequency domain, transfer ok logic is implemented.

First, find P1*P2 which is 140 ns in the illustrated example, then find C1 edges in P1*P2 which is 14 in the illustrated example, then implement ring counter that counts up to 13 in the illustrated example for C1 edges and then reset to 0, then get valid C1(clk1) edges, from the C program output, which are, clk1 Edge 1 - - - Valid - - - >Ts 4, Th 6,
clk1 Edge 5 - - - Valid - - - >Ts 6, Th 4,
clk1 Edge 8 - - - Valid - - - >Ts 4, Th 6,
clk1 Edge 12 - - - Valid - - - >Ts 6, Th 4, then
implement transfer_ok logic, where
transfer_ok=counter=1 or 5 or 8 or 12 in the illustrated example.

As described above with regard to FIG. 5, when the signal 560 output by the transfer ok component 524 is low, the output of the first output flip flop 513 does not change so that data reception is as desired in the second domain C2 504.

To transfer from a lower frequency domain to a higher frequency domain, capture ok, capture rise edge and capture fall edge logic is implemented (in the receiving clock domain). Since for a period P2, there is at least one (or more) period of P1 (P2>P1), it is unnecessary for the transmitting side to hold the data for more than one clock. It is up to the higher frequency receiving side to find valid capture edges within period P2 and latch the data.

First, get valid C1 (clk1) edges from the C program output, which are, clk1 Edge 1 - - - Valid - - - >Ts 10, Th 4,
clk1 Edge 2 - - - Valid - - - >Ts 6, Th 8,
clk1 Edge 5 - - - Valid - - - >Ts 8, Th 6,
clk1 Edge 6 - - - Valid - - - >Ts 4, Th 10,
clk1 Edge 8 - - - Valid - - - >Ts 10, Th 4,
clk1 Edge 9 - - - Valid - - - >Ts 6, Th 8,
clk1 Edge 12 - - - Valid - - - >Ts 8, Th 6,
clk1 Edge 13 - - - Valid - - - >Ts 4, Th 10, then
implement capture_rise_edge as,
capture_rise_edge=counter=1 or 2 or 5 or 6 or 8 or 9 or 12 or 13 in the illustrated example.

Capture_fall_edge logic is also implemented to mitigate the chance of losing data under certain conditions. For example, according to the C program C1 edge 3 violates setup time, and C1 edge 4 also has an associated violation. Since in 2 periods of P1 there could be two edges of C2, data may get lost. To avoid this, in some cases data is captured in the falling edge in C1 domain. The logic for capture_fall_edge is, capture_fall_edge=counter=0 or 3 or 4 or 7 or 10 or 11.
Finally, the logic for capture_ok is,
capture_ok=capture_rise_edge or capture_fall_edge.

Figure 8:
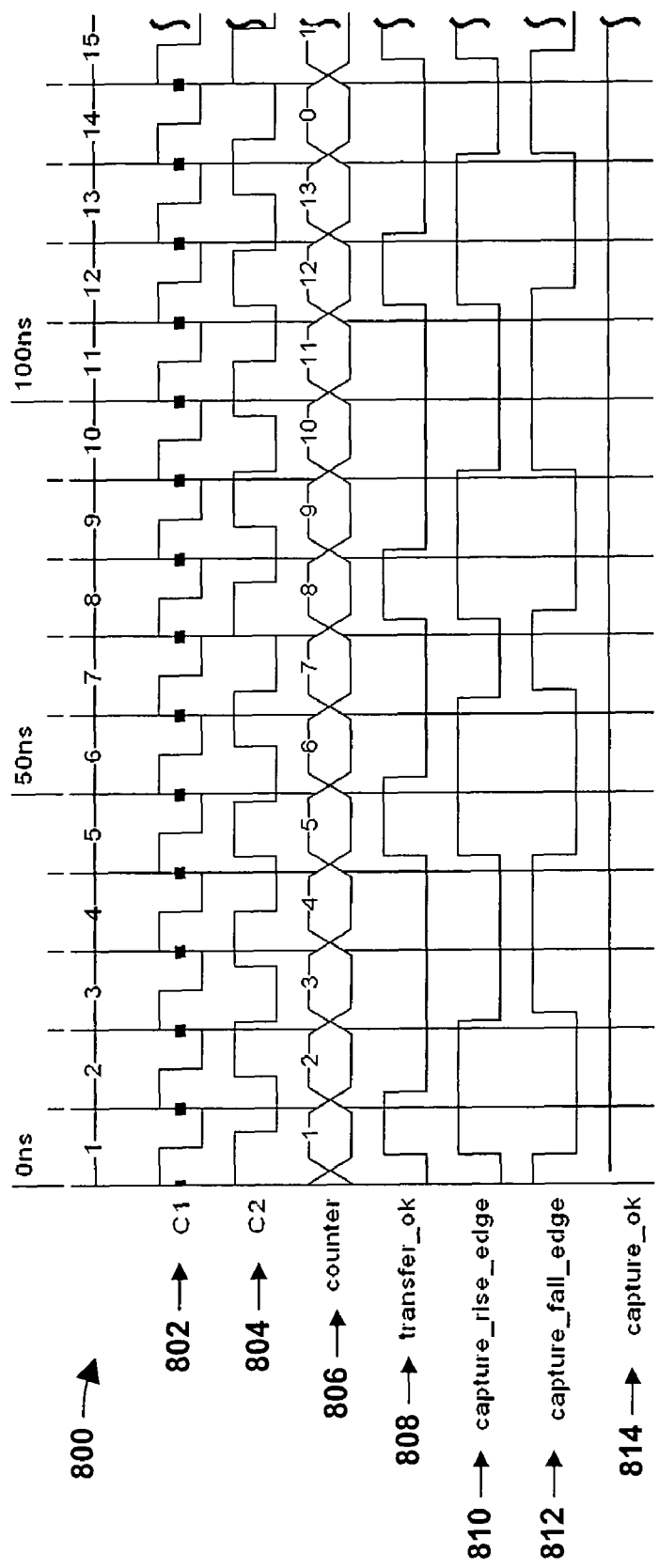
FIG. 8 is a timing diagram illustrating clock signals and data transfer signals, such as may correspond to those depicted in FIGS. 5 and 6, according to one or more aspects of the present invention.

Turning to FIG. 8, a timing diagram 800 illustrates a plurality of signals according to one or more aspects of the present invention. In particular, there are first 802 and second 804 clock signals and a counter 806. Additionally, signals for transfer ok 808, capture rise edge 810, capture fall edge 812 and capture ok 814 are also depicted. In illustrated example, transfer ok is high for a counter value of 1, 5, 8 and 12. Setup time and hold time requirements are satisfied where transfer ok is high with regard to rising edges of c1 and c2. In the illustrated example, setup time and hold time are defined in the definition of variables as 2 nanoseconds each. The determination to be made is whether to capture on rising edge or on falling edge. As such, capture rise edge and capture fall edge signals are input to the multiplexer (622, FIG. 6) from capture ok component (624, FIG. 6). If capture rise edge is high, data is captured on the rising edge. Conversely, if capture fall edge is high, data is captured on the falling edge.

Figure 9:
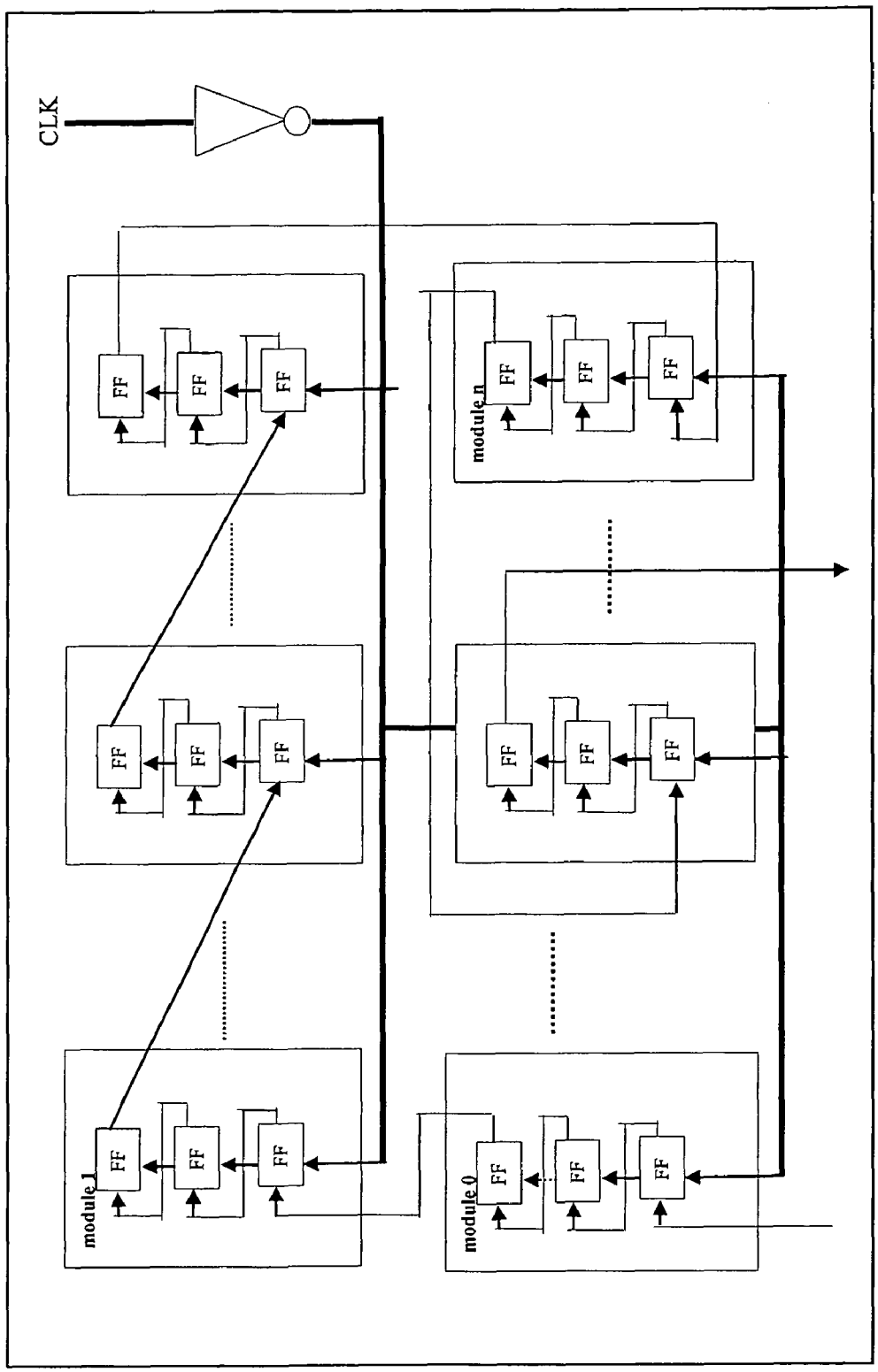
FIG. 9 is a schematic block diagram illustrating an exemplary arrangement for addressing design for testing (DFT) issues in accordance with one or more aspects of the present invention.

FIG. 9 illustrates an exemplary arrangement 900 that would allow for design for testing (DFT) issues to be addressed. The flip flops (FF) can, for example, be combined to create a chain for falling edge testing. For example, if 100 falling edge clocks were used in a particular implementation, the clocks can be chained together to create one DFT chain that will be used for falling edge testing.

Figure 10:
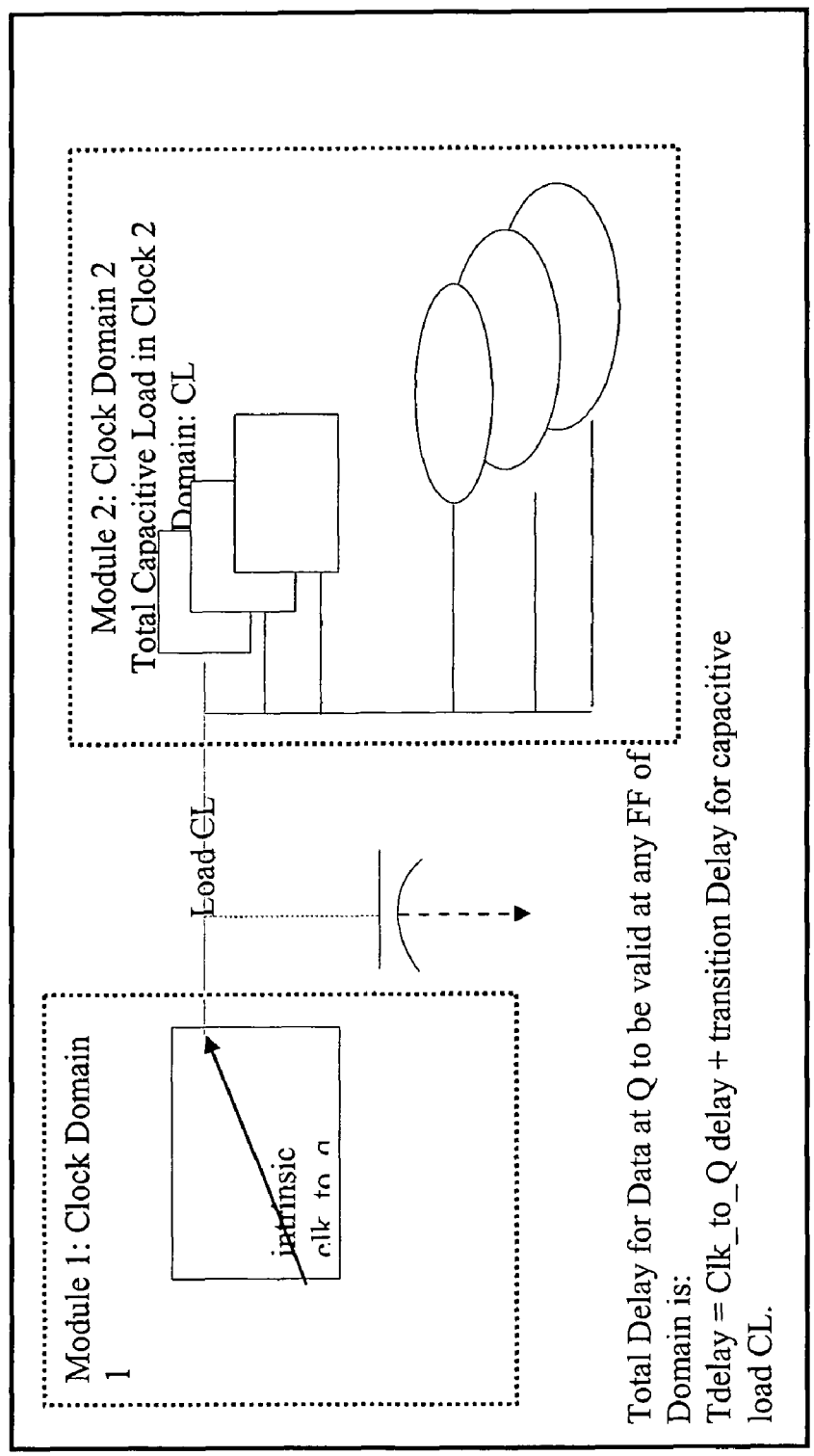
FIG. 10 is a schematic block diagram illustrating an exemplary representation of capacitive loading according to one or more aspects of the present invention.

FIG. 10 illustrates an exemplary representation of a capacitive load 1000 of an implementation according to one or more aspects of the present invention. The capacitive load is a function of the design of a particular implementation and is designated as Load CL in FIG. 10. The capacitive load may affect the setup and hold time, which are entered into an algorithm, such as that described above, according to one or more aspects of the present invention. It will be appreciated that a higher capacitive load generally leads to a longer setup time and a longer hold time. When proper setup and hold times are entered into the exemplary algorithm, for example, valid clock edges can be obtained for that particular capacitive loading.

It will thus be appreciated that one or more aspects of the present invention facilitate efficient digital data transfer while conserving valuable semiconductor real estate by, among other things, mitigating the use of synchronization stages and flip flops used therein. This may allow several busses to be combined within a cellular telephone, for example, which in turn allows the dimensions of the cellular telephone to be reduced while maintaining throughput and performance. By way of example, implementing one or more aspects of the present invention within memory architecture of a cellular telephone may allow respective memory busses for DRAM, FLASH, etc. to be combined within a single bus. It is to be appreciated, however, that one or more aspects of the present invention are not limited to cellular telephone applications, but instead have a relatively large scope of use in ASIC designs where data crosses different domains operating according to respective clocks.

It is to be appreciated that component as used herein can refer to a computer-related entity (e.g., hardware, an application specific integrated circuit (ASIC), software, a combination of hardware and software, software in execution, a process running on a processor, a processor, an object, an executable, a thread of execution, a program, a computer, an application running on a server, a server, a functional unit). Data may likewise refer to information that is in a useable format and/or that can be manipulated in a desired manner (e.g., by a computer). It is also to be appreciated that various aspects of the present invention may employ technologies associated with facilitating unconstrained optimization (e.g. back-propagation, Bayesian, Fuzzy Set, Non Linear regression, or other neural network paradigms including mixture of experts, cerebellar model arithmetic computer (CMACS), Radial Basis Functions, directed search networks, and functional link nets).

Although the invention has been shown and described with respect to one or more implementations, equivalent alterations and modifications will occur to others skilled in the art based upon a reading and understanding of this specification and the annexed drawings. The invention includes all such modifications and alterations. With regard to the various functions performed by the above described components (assemblies, devices, circuits, etc.), the terms (including reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary implementations of the invention. In addition, while a particular feature of the invention may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising." Also, the term "exemplary" as utilized herein simply means an example, rather than the best.

What is claimed is:

1. A system that facilitates data transfer between first and second domains, where a first clock of the first domain operates at a first frequency and a second clock of the second domain operates at a second frequency, where the first frequency is higher than the second frequency, and where the first and second clocks have arbitrary phase relationships relative to one another, comprising:

a transfer ok component configured to determine when to transfer data from the first domain to the second domain based upon at least one of a clock signal from the first domain and a clock signal from the second domain, a first multiplexer operatively coupled to the transfer ok component to receive a transfer ok signal from the transfer ok component indicative of when to effect a data transfer from the first domain to the second domain, the first multiplexer also operatively coupled to a first combinational logic component of the first domain to receive one or more first combinational signals from the first combinational logic component, the first multiplexer also operatively coupled to a first output flip flop in the first domain, where output from the first output flip flop is transferred to a second combinational logic component in the second domain when the transfer ok signal is high, and where output from the first output flip flop is fed back into the first multiplexer when the transfer ok signal is low.

2. The system of claim 1, where the first combinational logic component is configured to receive first external signals.

3. The system of claim 1, where output from the first output flip flop is fed back into the first multiplexer via a feedback loop.

4. The system of claim 1, where the first output flip flop is operatively coupled to the first clock of the first domain.

5. The system of claim 1, where a first flip flop of the first domain is operatively coupled to the first combinational logic component.

6. The system of claim 5, where the first flip flop is operatively coupled to the first clock of the first domain.

7. The system of claim 1, where output from the first output flip flop is operatively coupled to a second flip flop of the second domain.

8. The system of claim 7, where the second flip flop is operatively coupled to the second clock of the second domain.

9. The system of claim 1, where the transfer ok component is at least partially implemented in a computer program stored in a non-transitory computer-readable medium.

* * * * *